United States Patent
Maloney et al.

(10) Patent No.: US 6,588,409 B2
(45) Date of Patent: Jul. 8, 2003

(54) ENGINE COLD START FUEL CONTROL METHOD HAVING LOW VOLATILITY FUEL DETECTION AND COMPENSATION

(75) Inventors: Peter James Maloney, Dearborn, MI (US); In Kwang Yoo, Ann Arbor, MI (US); Deog H. Yoo, Inchon (KR); Andrew D. Herman, Linden, MI (US); Hallett D. Breidenbach, West Bloomfield, MI (US); Craig A. Carlson, Honeoye Falls, NY (US)

(73) Assignee: Delphi Technologies, Inc., Troy, MI (US)

(*) Notice: Subject to any disclaimer, the term of this patent is extended or adjusted under 35 U.S.C. 154(b) by 111 days.

(21) Appl. No.: 10/035,141

(22) Filed: Sep. 13, 2001

(65) Prior Publication Data

US 2002/0104521 A1 Aug. 8, 2002

Related U.S. Application Data

(60) Provisional application No. 60/232,265, filed on Sep. 14, 2000.

(51) Int. Cl.$^7$ ............................ F02D 41/06; F02D 41/14
(52) U.S. Cl. ...................... 123/686; 123/491; 123/687
(58) Field of Search ...................... 123/179.16, 491, 123/685, 686, 687

(56) References Cited

U.S. PATENT DOCUMENTS

| | | | | |
|---|---|---|---|---|
| 6,079,396 A | * | 6/2000 | Ament et al. | 123/491 X |
| 6,360,726 B1 | * | 3/2002 | Javaherian | 123/491 |

* cited by examiner

*Primary Examiner*—Tony M. Argenbright
(74) *Attorney, Agent, or Firm*—Vincent A. Chichosz

(57) ABSTRACT

An improved engine fuel control detects combustion instability due to the use of high driveability index (DI) fuel during cold start and warm-up and compensates the fuel control for detected combustion instability through temporary enrichment of the delivered air/fuel ratio. The usage of high DI fuel is detected during engine cranking by measuring the time required for the engine speed to increase from a lower reference speed to an upper reference speed, provided the engine run time is less than a calibrated value. A timer is started when the lower reference speed is achieved, and the timer value is compared to a crank time threshold determined as a function of the initial engine coolant temperature. If the timer value exceeds the crank time threshold before the engine speed reaches the upper reference speed, the presence of high DI fuel is indicated, and the air/fuel ratio is temporarily enriched.

6 Claims, 4 Drawing Sheets

ENGINE COLD START FUEL CONTROL METHOD HAVING LOW VOLATILITY FUEL DETECTION AND COMPENSATION

This application claims priority to U. S. Provisional Application Ser. No. 60/232,265 filed Sep. 14, 2000.

TECHNICAL FIELD

The present invention relates to a fuel control for an internal combustion engine designed to operate with a lean air/fuel ratio, and more particularly to a control that detects combustion instability due to the use of low volatility fuel during cold start operation, and for compensating the fuel control to alleviate detected instability.

BACKGROUND OF THE INVENTION

It is well known that motor vehicle fuels contain a variety of different compounds, and that the fuel volatility can therefore vary significantly from tank to tank. In an effort to quantify this variation, the industry has developed a driveability index (DI) based on a summation of specified distillation measurements, weighted to reflect their relative effect on combustion stability an internal combustion engine. In general, high volatility fuels have a relatively low DI value, whereas low volatility fuels have a relatively high DI value.

In an engine fuel control, the volatility of the injected fuel is most critical during cold starting and warm-up, since the internal surfaces of the engine may not be hot enough to vaporize a sufficient quantity of high DI fuel. For this reason, automotive fuel controls have traditionally been designed to enrich the cold calibration to ensure that the engine will start and run acceptably with high DI fuel. This enrichment to compensate for high DI fuel causes the air/fuel to be richer than optimum with medium and low DI fuel, resulting in higher hydrocarbon emissions than if the appropriate calibration were used. Thus, low emission engines designed to operate at leaner air/fuel ratios during cold starting and warm-up may experience degraded driveability due to combustion instability if a high DI fuel is being used. Accordingly, what is needed is a control method that permits the use of lean air/fuel ratio control during cold starting and warm-up while minimizing degraded driveability due to the use of high DI fuel.

SUMMARY OF THE INVENTION

The present invention is directed to an improved engine fuel control that detects combustion instability due to the use of high DI fuel during cold start and warm-up and that compensates the fuel control for detected combustion instability through temporary enrichment of the delivered air/fuel ratio. According to the present invention, the usage of high DI fuel is detected during engine cranking by measuring the time required for the engine speed to increase from a lower reference speed to an upper reference speed, provided the engine run time is less than a calibrated value. A timer is started when the lower reference speed is achieved, and the timer value is compared to a crank time threshold determined as a function of the initial engine coolant temperature. If the timer value exceeds the crank time threshold before the engine speed reaches the upper reference speed, the presence of high DI fuel is indicated, and the air/fuel ratio is temporarily enriched to alleviate the instability and to ensure acceptable driveability without unnecessarily increasing hydrocarbon emissions in the engine exhaust gases.

BRIEF DESCRIPTION OF THE DRAWINGS

FIG. 4 depicts a routine for detecting combustion instability due to the use of high DI fuel during engine cranking, and FIG. 5 depicts a routine for controlling the engine air/fuel ratio in response to the detection of high DI fuel.

DESCRIPTION OF THE PREFERRED EMBODIMENT

Figure 1:
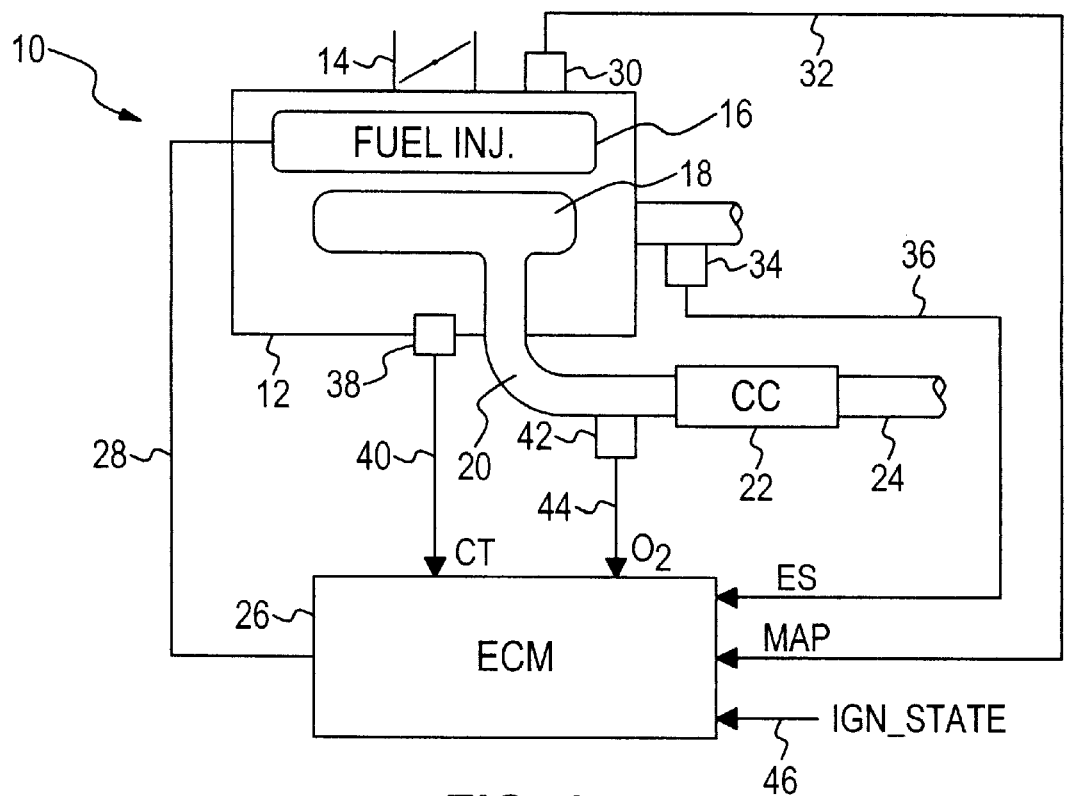
FIG. 1 is a diagram of an engine fuel control system, including a microprocessor-based engine control unit for controlling engine fueling.

Referring to the drawings, and particularly to FIG. 1, the reference numeral 10 generally designates a motor vehicle engine and control system according to this invention. The engine 12 includes a throttle valve 14 through which intake air is ingested, a fuel injection system 16 for injecting a precisely controlled quantity of fuel for mixture with the intake air, an exhaust manifold for collecting exhaust gases after the air/fuel mixture is ignited, a catalytic converter (CC) 22 coupled to the exhaust manifold 18 via runner 20, and a tail pipe 24 exiting the catalytic converter 22. The fuel injection system 16 and other electronic sub-systems of engine 12 are controlled by a microprocessor-based engine control module (ECM) 26 in response to various inputs. To this end, ECM 26 is coupled to fuel injection system 16 via line 28. The various inputs pertinent to the fuel control include the intake manifold absolute pressure (MAP) on line 32, the engine speed (ES) on line 36, the engine coolant temperature (CT) on line 40, the exhaust gas oxygen signal (O2) on line 44, and the ignition state (IGN_STATE) on line 46. Such input signals are obtained with conventional sensors 30, 34, 38, 42 well known to those skilled in the art.

In general, ECM 26 determines an appropriate quantity of fuel to be injected by injection system 16 based on a measure or estimation of the ingested inlet mass air flow and a target air/fuel ratio for combustion in the engine cylinders. During cold starting and warm-up of the engine 12, the exhaust gas oxygen sensor 42 is inoperative, and the fuel injection quantity is determined in an open-loop manner based on the above mentioned inputs to produce an open-loop air/fuel ratio AFR_OL, such as depicted by the corresponding trace in FIG. 3. Such ratio may be somewhat richer than the stoichiometric ratio as indicated since the internal surfaces of engine 12 are initially too cool to completely vaporize the injected fuel. This is particularly the case if the driveability index (DI) of the fuel is relatively high, indicating that a relatively high temperature is required to vaporize specified percentages of the fuel. While hydrocarbon emissions can be minimized by starting engine 12 with an air/fuel ratio that is as lean as possible, combustion instability can occur if an insufficient percentage of the injected fuel vaporizes, and of course, the fuel volatility can vary considerably. The present invention permits the use of a relatively lean open-loop air/fuel ratio control during cold starting and warm-up without risking combustion instability due to the presence of high DI fuel by identifying engine speed variation that is characteristic of high DI fuel usage during engine cranking, and adjusting the open-loop fuel control to temporarily enrich the delivered air/fuel ratio when high DI fuel is detected.

Figure 2:
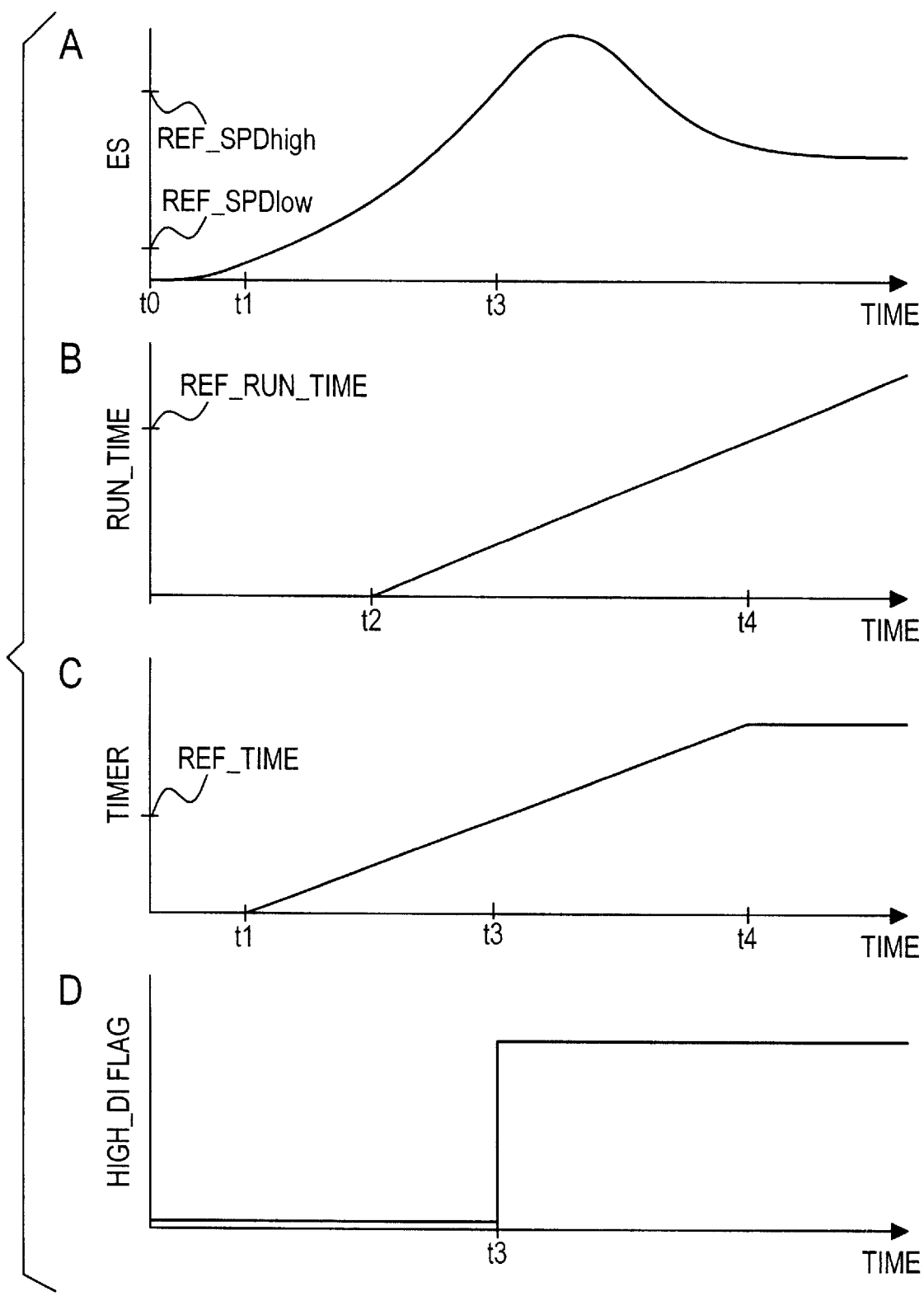
FIG. 2, Graphs A–D, graphically depict the operation of this invention when the engine of FIG. 1 is operated with high DI fuel.

The detection of high DI fuel according to this invention is graphically illustrated in FIG. 2. Graph A depicts the engine speed ES, Graph B depicts the engine run time (RUN_TIME), Graph C depicts a measured time (TIMER) according to the invention, and Graph D depicts the status of a HIGH_DI flag according to this invention, all as a function of time. In general, the presence of high DI fuel is detected if the time required for the engine speed ES to increase from a first reference speed REF_SPDlow to a second reference speed REF_SPDhigh exceeds a reference time REF_TIME, provided RUN_TIME has not exceeded a threshold REF_RUN_TIME. As indicated in Graphs A and C, a timer is started at time t1 when the engine speed ES reaches the first reference speed REF_SPDlow, and the timer value is compared to the threshold REF_TIME, which is determined as a function of the engine coolant temperature at start-up (CTstart-up). In the illustrated example, the timer value exceeds REF_TIME at time t3 before the engine speed ES reaches the second reference speed REF_SPDhigh, and the presence of high DI fuel is indicated by the status of the HIGH-DI flag, as shown in Graph D. The run time measure, depicted in Graph B, is initiated when the engine speed ES reaches a predetermined level at time t2; in the illustrated example, the run time reaches the reference REF_RUN_TIME at time t4, well after high DI fuel is detected at time t3.

Figure 4:
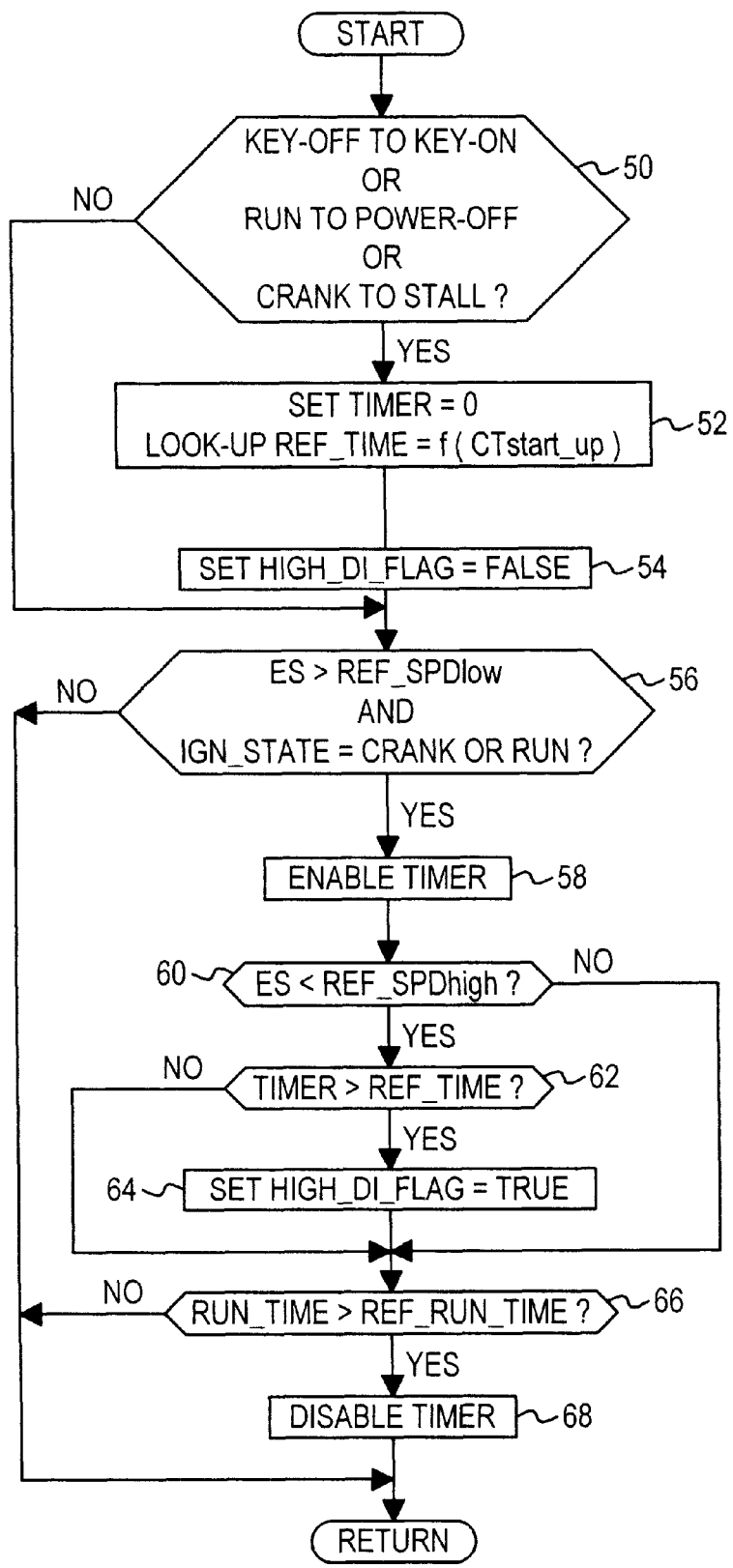
FIGS. 4–5 are flow diagrams representative of software routines executed by the engine control unit of FIG. 1 in carrying out the control of this invention.

FIG. 4 depicts a flow diagram of a routine periodically executed by ECM 26 for carrying out the above-described detection method. Referring to FIG. 4, the blocks 50, 52, 54 initialize the timer and the HIGH DI flag, and look-up the reference time REF_TIME as a function of CTstart-up when IGN_STATE indicates a transition from key-off to key-on, or run to power-off, or crank to stall. In general, REF_TIME is calibrated to compensate for variations in fuel vaporization due to the initial temperature of engine 12. At low initial temperatures, fuel vaporization is reduced, and REF_TIME is relatively long; at higher initial temperatures, fuel vaporization is increased, and REF_TIME is relatively short. Following initialization, the block 56 determines if the engine speed ES is greater than REF_SPDlow and IGN_STATE is crank or run. If block 56 is answered in the affirmative, the blocks 58–68 are executed to determine if high DI fuel is in use. The block 58 enables the timer; this coincides with time t1 in FIG. 2. As long as ES is less than REF_SPDhigh, as determined at block 60, the block 62 compares the timer with REF_TIME and the block 66 compares the run time with REF_RUN_TIME. If the timer reaches REF_TIME before ES reaches REF_SPDhigh, the block 64 sets the HIGH_DI flag to TRUE; this corresponds with time t3 in FIG. 2. However, the block 68 disables the timer when the run time reaches REF_RUN_TIME. In summary, the HIGH_DI flag is set to TRUE if: (1) IGN_STATE is run or crank, (2) the run time is less than REF_RUN_TIME, and (3) the time required for ES increase from REF_SPD_low to REF_SPDhigh exceeds REF_TIME.

Figure 3:
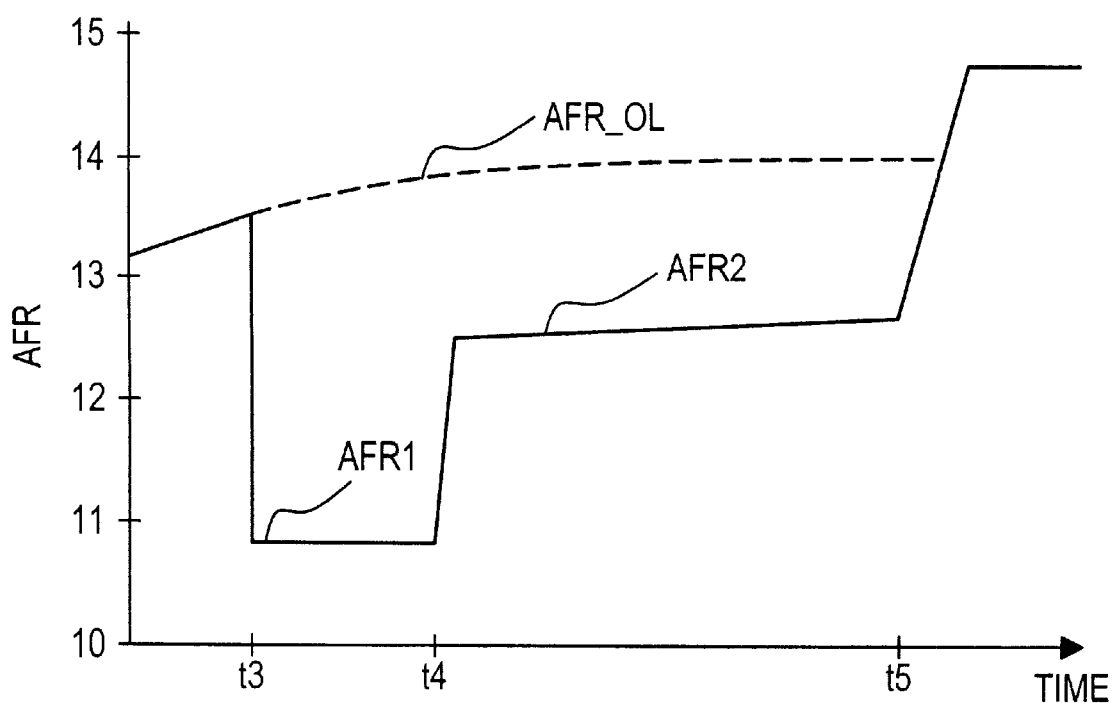
FIG. 3 is a graph depicting a control of engine air fuel ratio according to this invention.

Once the usage of high DI fuel is detected, the ECM 26 temporarily enriches the target air/fuel ratio, as graphically depicted in FIG. 3. When the HIGH_DI flag is set to TRUE at time t3, the desired air/fuel ratio is quickly reduced (enriched) to a fixed level AFR1 based on the product of the open-loop air/fuel ratio target AFR_OL at time t3 and a first fuel enrichment factor FEF1 determined as a function of the engine coolant temperature CT, and held at AFR1 for a predetermined time HOLD_TIME (signified by the duration t3–t4). Thereafter, the desired air/fuel ratio is increased (enleaned) to a variable level AFR2 based on the product of the current open-loop air/fuel ratio target AFR_OL and a second fuel enrichment factor FEF2, also determined as a function of CT. When closed-loop fuel control is enabled at time t5, the engine is considered to be warmed-up, and the desired air/fuel ratio is ramped up (enleaned) to the stoichiometric ratio (or other closed-loop target ratio), whereafter closed-loop fuel control is initiated.

Figure 5:
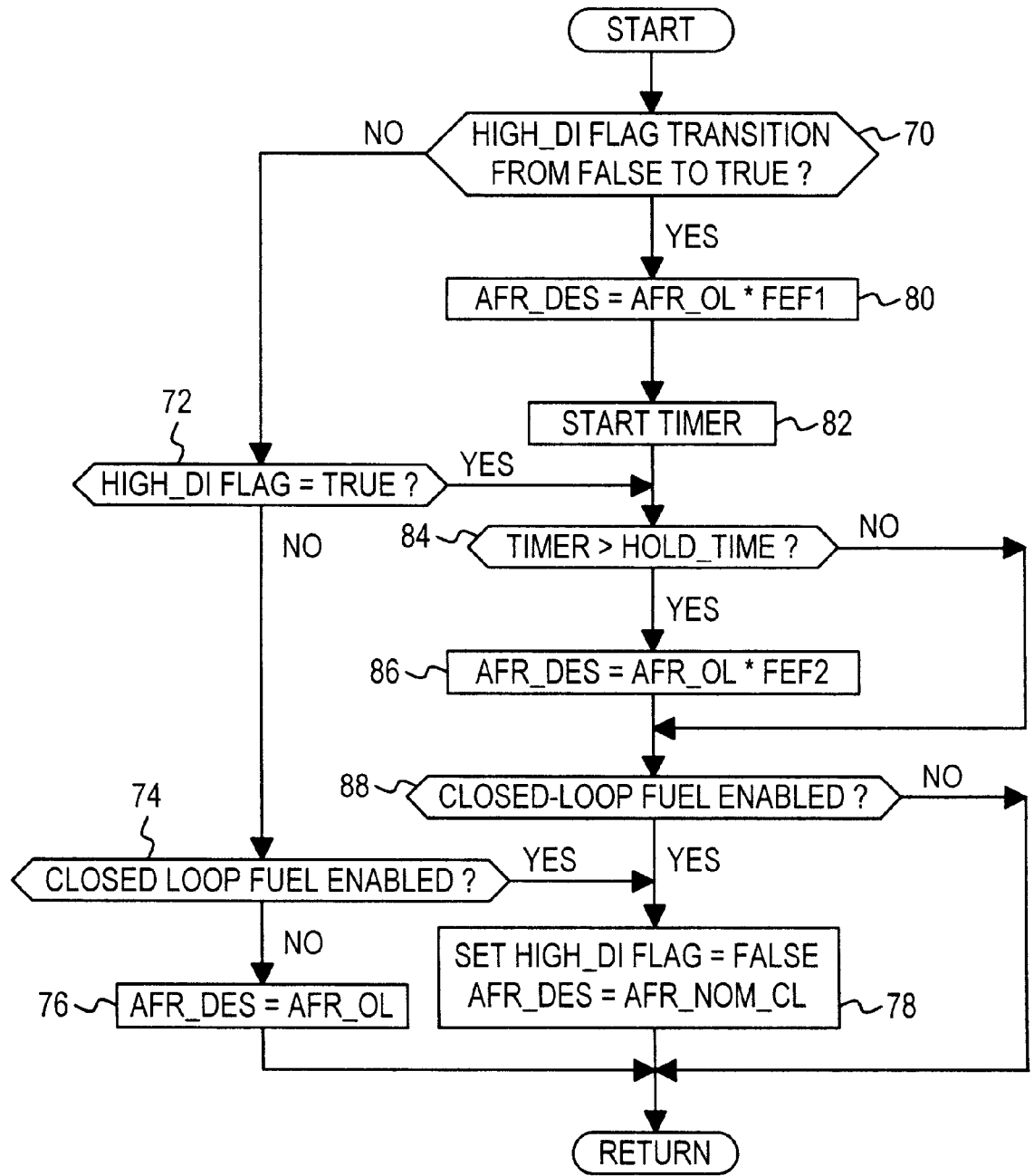

FIG. 5 depicts a flow diagram of a routine periodically executed by ECM 26 for carrying out the above-described air/fuel ratio control. Referring to FIG. 5, the block 70 is first executed to detect a transition of the HIGH_DI flag from FALSE to TRUE. Initially, of course, block 70 is answered in the negative, as are blocks 72 and 74, and block 76 sets the desired air/fuel ratio (AFR_DES) to AFR_OL. If the HIGH_DI flag is not set during cranking, AFR_OL is maintained until block 74 determines that closed-loop control is enabled, whereafter block 78 sets the HIGH_DI flag to FALSE and sets AFR_DES to the nominal closed-loop target ratio AFR_NOM_CL. When block 70 detects a transition of the HIGH_DI flag, block 80 sets AFR_DES to the product (AFR_OL*FEF1), and block 82 starts a timer. If the timer reaches HOLD_TIME before closed-loop fuel control is enabled, as determined by blocks 84 and 88, the block 86 is executed to set AFR_DES to the product (AFR_OL*FEF2). And when closed-loop fuel control is finally enabled, the block 78 is executed as described above to set the HIGH_DI flag to FALSE and set AFR_DES to the nominal closed-loop target ratio AFR_NOM_CL.

In summary, the control method of the present invention detects combustion instability due to the use of high DI fuel during cold start and warm-up and compensates the fuel control for detected combustion instability. When the presence of high DI fuel is detected, the air/fuel ratio is temporarily enriched to alleviate the instability and to ensure acceptable driveability without unnecessarily increasing hydrocarbon emissions in the engine exhaust gases. While the present invention has been described in reference to the illustrated embodiments, it is expected that various modifications in addition to those mentioned above will occur to those skilled in the art. Thus, it will be understood that methods incorporating these and other modifications may fall within the scope of this invention, which is defined by the appended claims.

What is claimed is:

1. A method of operation for an internal combustion engine having an open-loop fuel control for maintaining an air/fuel ratio of said engine at a target value during engine starting and warm-up, comprising the steps of:

measuring a speed of said engine during engine starting;

determining a time required for the measured speed to increase from a lower reference speed to an upper reference speed;

detecting the presence of high driveability index fuel if the determined time exceeds a reference time; and temporarily enriching said air/fuel ratio relative to said target value when the presence of high driveability index fuel is detected.

2. The method of operation of claim 1, including the step of:

determining said reference time as a function of engine temperature when engine starting is initiated to compensate for variations in an initial temperature of said engine.

3. The method of operation of claim 2, including the steps of:

detecting a transition to or from engine starting; and re-determining said time and said reference time after said transition is detected.

4. The method of operation of claim 1, including the steps of:

starting a timer during engine starting when the measured engine speed exceeds said lower reference speed;

comparing said timer to said reference time so long as the measured engine speed is less than said upper reference speed;

stopping said timer when a run time of said engine exceeds a reference run time; and detecting the presence of high driveability index fuel if the timer reaches said reference time.

5. The method of operation of claim 4, including the steps of:

detecting a transition to or from engine starting; and resetting said timer when said transition is detected.

6. The method of operation of claim 1, wherein the step of temporarily enriching said air/fuel ratio includes the steps of:

holding said air/fuel ratio at a first value determined as a function of said target value and a temperature of said engine;

controlling said air/fuel ratio according to a second value intermediate said first value and said target value; and adjusting said air/fuel ratio to a closed-loop target value upon completion of said warm-up.

* * * * *